United States Patent [19]

Aspinwall

[11] 4,328,950
[45] May 11, 1982

[54] MAGNETIC DETENT FOR A CONTROL VALVE

[75] Inventor: Ronald A. Aspinwall, Detroit, Mich.

[73] Assignee: Sperry Corporation, Troy, Mich.

[21] Appl. No.: 260,965

[22] Filed: May 6, 1981

Related U.S. Application Data

[63] Continuation of Ser. No. 93,781, Nov. 13, 1979, abandoned.

[51] Int. Cl.³ .............................................. F16K 35/04
[52] U.S. Cl. ................................................... 251/297
[58] Field of Search .................... 251/68, 70, 297, 65; 137/624.14, 625.69

[56] References Cited

U.S. PATENT DOCUMENTS

| | | |
|---|---|---|
| 2,632,821 | 3/1953 | Wright et al. ................. 251/297 |
| 2,836,194 | 5/1958 | Tjaden ............................ 251/68 |
| 3,326,236 | 6/1967 | Beckett et al. ............. 137/624.14 |
| 3,438,399 | 4/1969 | Barnes et al. ............. 137/625.69 |
| 3,645,226 | 2/1972 | Mays et al. ................. 251/297 |
| 3,667,723 | 6/1972 | Schneider ....................... 251/68 |
| 3,790,129 | 2/1974 | Pauls ............................. 251/297 |
| 3,899,003 | 8/1975 | Tirelli .......................... 251/297 |
| 3,942,485 | 3/1976 | Suda et al. .................. 251/297 |
| 4,195,551 | 4/1980 | Schmiel ........................ 251/297 |

FOREIGN PATENT DOCUMENTS 2506453 8/1976 Fed. Rep. of Germany ...... 251/297

*Primary Examiner*—H. Jay Spiegel
*Attorney, Agent, or Firm*—Theodore Van Meter; Joseph S. Failla

[57] ABSTRACT

A magnetic detent housed in an end cap adapted for mounting to a hydaulic control valve having a reciprocally actuated spool movable from a neutral to a detented position. The magnetic detent including a spool extension formed with a detent groove and slidably supported in a retainer mounting a plurality of radially movable balls. A centering spring exerting a biasing force for urging the extension to the neutral position. A clapper movably mounted on and in driving contact with the balls and spaced from a magnet member generating a magnetic force. A spring member exerting a relatively light pre-load force for urging the balls against the periphery of the extension and driving the clapper into magnetically held contact with the magnet member. The pre-load and magnetic forces combining to form a detenting force locking the balls against the biasing force of the centering spring. The biasing and pre-load forces combining to form a shifting force resisting movement of the extension from the neutral position.

11 Claims, 5 Drawing Figures

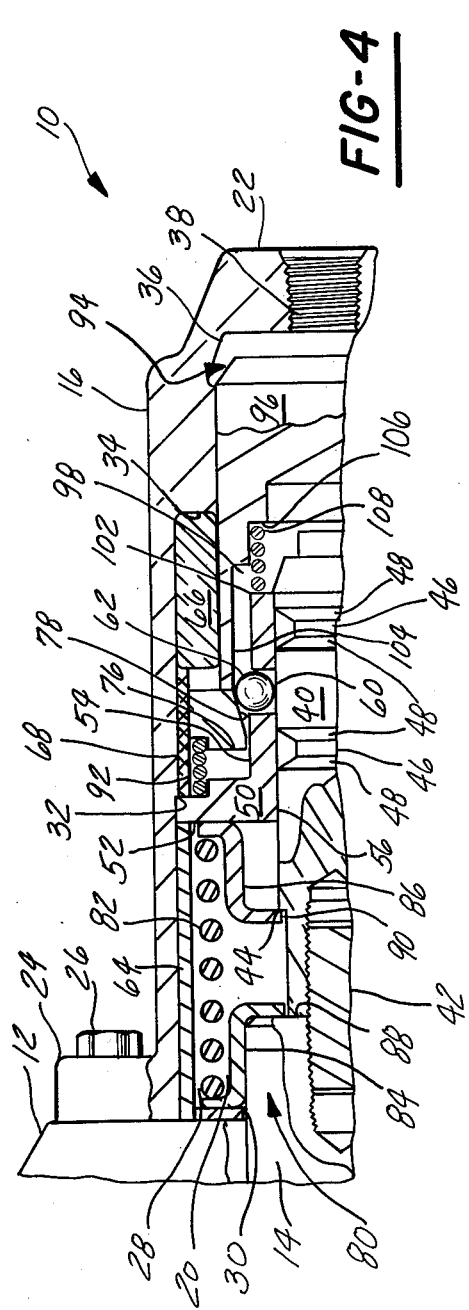
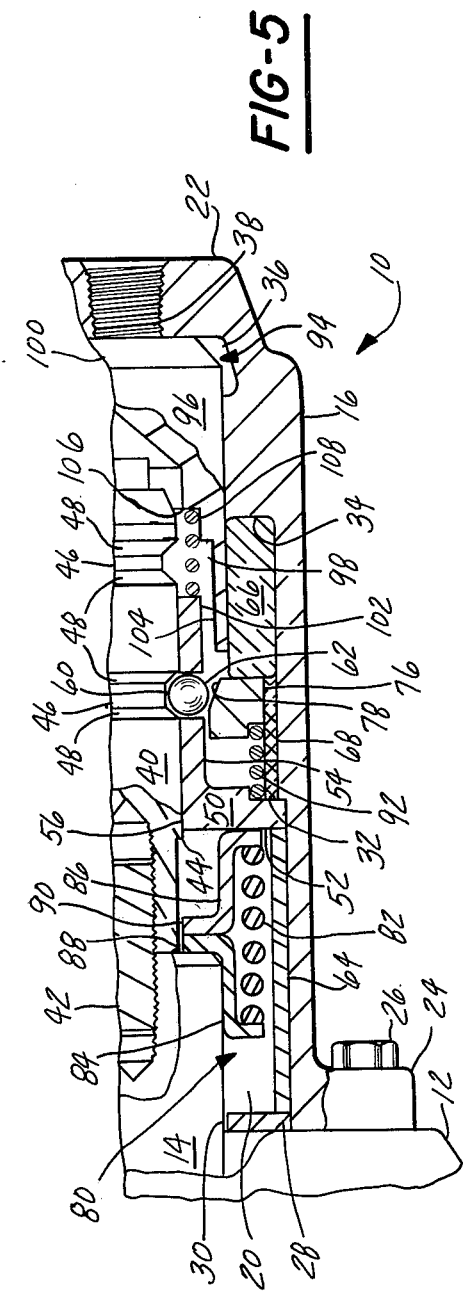

MAGNETIC DETENT FOR A CONTROL VALVE

This application is a continuation of application Ser. No. 093,781, filed Nov. 13, 1979, now abandoned.

BACKGROUND AND SUMMARY

This invention relates to hydraulic control valves and more particularly to sliding spool type control valves provided with a detent mechanism.

Control valves of the type contemplated include a valve body having an elongated bore in which a reciprocally actuated spool is movable from a neutral position to a detented position for controlling fluid flow through passages formed in the valve body. The spool is engaged by a centering spring which in the absence of other forces acting on the spool urges the spool to the neutral position. In the detented position, a detent mechanism applies a detenting force to the spool which holds or locks movement of the spool against the biasing force of the centering spring.

In a known type of mechanical detent the centering spring and the detent mechanism are housed in an end cap detachably mounted to the valve body. The detent mechanism includes a spool extension having one or more detent grooves formed therein and is attached to the valve spool for movement therewith. The spool extension is mounted for sliding movement in a stationary ball retainer positioned in the end cap. The ball retainer mounts a plurality of balls for radial movement in an axially aligned row with the balls spaced radially around the periphery of the spool extension. A movable ring-shaped clapper member rides on the row of balls and a detent spring acting on the clapper provides a detenting force that urges the balls radially against the periphery of the spool extension. Both the biasing force and the detenting force combine to form a shifting force required to move the spool from the neutral position to the detented position.

Movement of the spool from the neutral position aligns a detent groove with the row of balls. As the groove is aligned with the row of balls the detenting force drives the balls radially into the groove. In this position, the resulting force balance between the biasing force and the detenting force securely locks the spool against the biasing force tending to return the spool to the neutral position. Release of the spool from the detented position requires displacement of the clapper member effecting a change in the force balance wherein the biasing force acting on the balls through the detent groove drives the balls radially outward of the detent groove to free the spool extension and spool for return to the neutral position.

Control valves of the type described control equipment used for earth moving, construction, and mining applications. These applications require increasingly powerful force multiplying actuators resulting in increased fluid pressure acting on the valve spools. The increased pressure calls for stronger centering and detent spring forces with a corresponding increase in the shifting forces required to move the spool. In lever actuated spools, the increased shifting force leads to operator fatigue after repeated actuations.

The present invention is directed to providing a magnetic detent mechanism for reducing the shifting force required to move the spool of a control valve during movement of the spool to a detented position.

To this end a magnetic detent mechanism is provided for a control valve having a sliding spool movable from a neutral position to a detented position. The magnetic detent is housed within an end cap detachably mounted to the valve. The magnetic detent includes a movable spool extension attached to the spool for movement therewith and having a detent groove formed therein. A stationary ball retainer mounted in the end cap includes a bore extending therethrough supporting the spool extension for sliding movement therein. A plurality of balls are mounted in the ball retainer and held thereby for radial movement and in contact with the periphery of the spool extension. A centering spring mounted in the cap between the ball retainer and the valve imparts a biasing force to the spool urging the spool and attached spool extension from the detented position to the neutral position. A magnet member having a predetermined magnetic force is mounted in the end cap spaced from the centering spring on the opposite side of the ball retainer. A clapper member having an inclined ramp portion riding on the balls is movable between the ball retainer and the magnet member. A spring member engaging the clapper member exerts a pre-load force on the clapper member urging the clapper member into contact with the magnet member and urging the balls radially for engagement with the detent groove.

With the spool moved to the detented position the balls are driven into the detent groove by the pre-load force acting on the clapper member. The pre-load force also drives the clapper member into contact with the magnet member. The clapper member is held by the magnetic force which combines with the pre-load force to form a detenting force acting on the balls which are engaged in the detent groove. The resulting force balance between the detenting force and the biasing force locks the spool against the biasing force tending to return the spool to the neutral position. Inasmuch as the spool extension senses the effects of the detenting force only after the balls are engaged in the detent groove, the shifting force required to move the spool to the detented position need only be sufficient to overcome the combined biasing and pre-load forces acting on the spool extension.

Further advantages and details of my invention can be had from the following description and claims taken together with the accompanying drawing.

DESCRIPTION OF THE DRAWING:

In the drawing:

FIG. 4 is a variation of the magnetic detent as shown in FIG. 2;

FIG. 5 is a variation of the magnetic detent as shown in FIG. 3.

DETAILED DESCRIPTION

Figure 1:
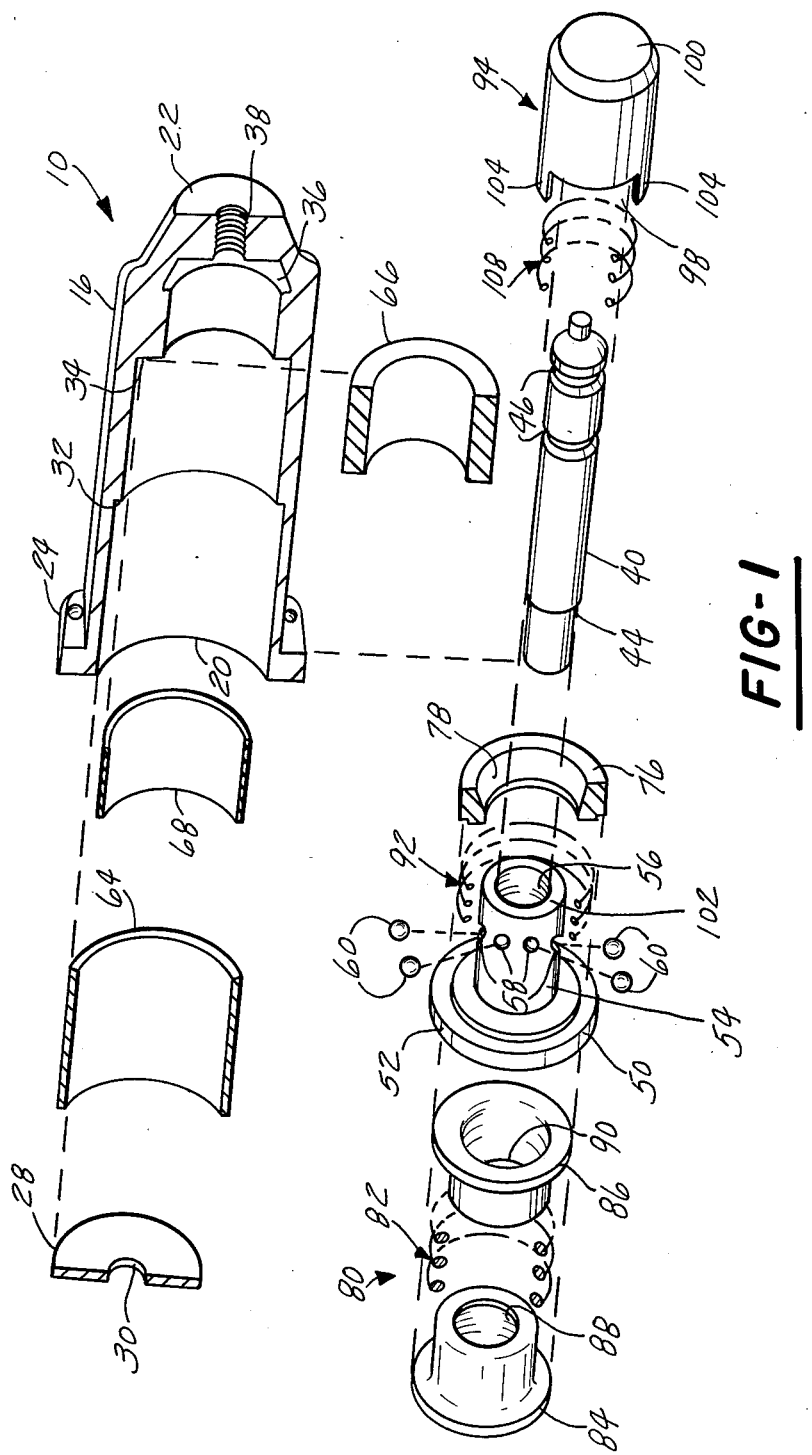
FIG. 1 is an exploded assembly perspective view of the magnetic detent of the present invention.

Referring now to the drawing, a magnetic detent 10 for a hydraulic control valve is shown in FIG. 1. The valve, only partially shown in FIGS. 2–5, includes a valve body 12 and a sliding spool 14 movable from a neutral position, FIGS. 2 and 4, to a detented position, FIGS. 3 and 5. The magnetic detent is housed within an elongated cylindrically shaped hollow end cap 16 having an open end 20 spaced from a closed end 22. The open end 20 is formed with a flange 24 adapted for detachable mounting of end cap 16 to valve body 12 by any suitable fastening means such as threaded bolts 26. A disc shaped closure member 28 having a central opening 30 is positioned within end cap 16 adjacent open end 20 flush with flange 24. End cap 16 is formed with an annular first shoulder 32 on the interior surface of the end cap intermediate ends 20 and 22 and a second annular shoulder 34 adjacent closed end 22. Closed end 22 is formed with a chamber 36 communicating with an internally threaded inlet 38. Inlet 38 (FIGS. 3 and 5) being adapted for connection to a suitable source of pressurized fluid.

An elongated rod shaped spool extension 40 is positioned for longitudinal axial movement within end cap 16. Spool extension 40 is adapted for attachment to spool 14, FIGS. 2-5, for movement therewith as by a threaded stud member 42 engaging internally threaded openings formed in spool extension 40 and spool 14. Spool extension 40 is formed with an annular shoulder 44 adjacent the end attached to spool 14 and annular detent groove 46 are formed in the periphery of spool extension 40 adjacent the opposite end thereof. Detent grooves 46 include a groove ramp 48 inclined at an angle with respect to a plane perpendicular to the direction of movement of spool extension 40.

A cylindrically shaped ball retainer 50 is mounted within end cap 16 intermediate of open and closed ends 20, 22. Ball retainer 50 is formed with a radially extending flange portion 52 having a surface thereof abutting against first shoulder 32 formed on the interior surface of end cap 16. Extending axially from flange portion 52 in the direction of closed end 22 is a cylindrically shaped hub portion 54 of ball retainer 50. Hub portion 54 includes an axial bore 56 extending therethrough supporting spool extension 40 for axial sliding movement therein. A plurality of axially aligned radially spaced openings 58 are formed in hub portion 54. Each opening 58 retaining a radially movable ball 60 forming an axially aligned row of balls in contact with the periphery of spool extension 40 with a portion 62, FIGS. 2-5, of the balls extending above the periphery of hub portion 54. A tubular spacer 64 positioned between flange portion 52 of ball retainer 50 and closure member 28 maintains ball retainer 50 in abutting contact with first shoulder 32 and stationary within end cap 16.

Figure 2:
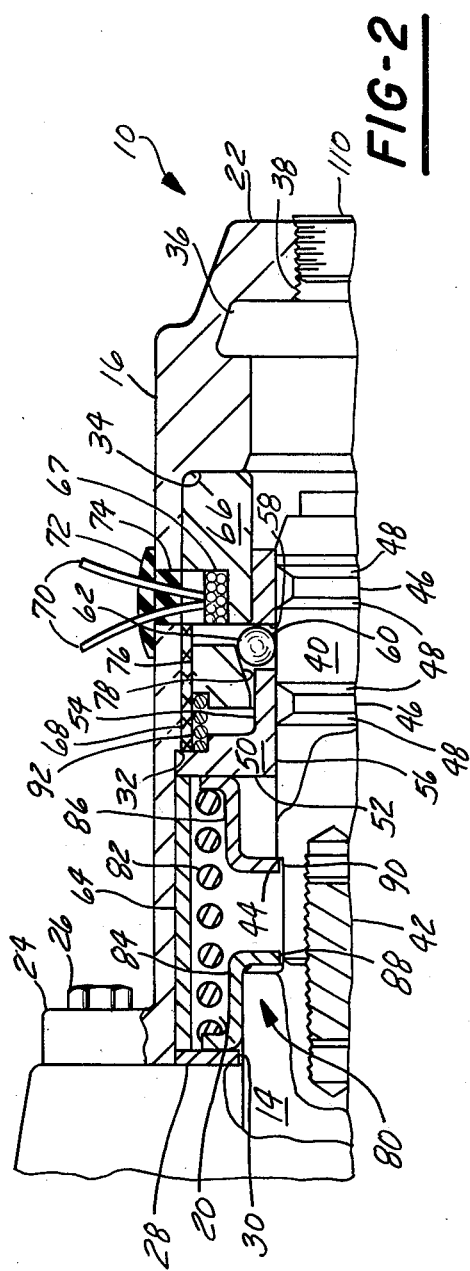
FIG. 2 is a partial section showing the upper half of the assembled magnetic detent of FIG. 1 in a neutral position.
Figure 3:
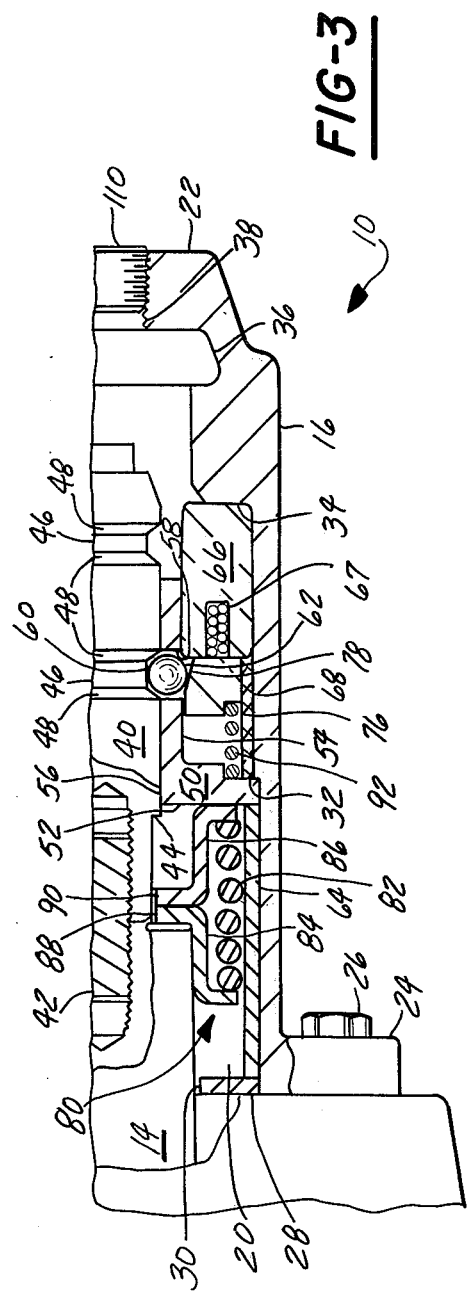
FIG. 3 is a partial section showing the lower half of the assembled magnetic detent of FIG. 1 in a detented position.

A doughnut shaped magnet member 66 for generating a magnetic force is mounted in end cap 16 adjacent closed end 22 thereof with an end force of magnet member 66 arranged in abutting relationship with second annular shoulder 34 of end cap 16. Magnet member 66 is maintained stationary within end cap 16 by a tubular spacer 68 formed of a non-magnetic material such as aluminum or stainless steel. The tubular non-magnetic spacer 68 is positioned in abutting relationship between ball retainer 50 and magnet member 66. Magnet member 66, as shown in FIGS. 2 and 4, is an electromagnet including an electrically energizable coil 67 having a pair of leads 70, FIG. 2, extending through a sealing member 72 positioned in an opening 74 in end cap 16. The electromagnet is energized by connection of leads 70 to a suitable source of power. However, in hazardous atmospheres such as that encounted in mines, a permanent magnet, as shown in FIGS. 3 and 5, may be used in place of the electromagnet illustrated in FIGS. 2 and 4. In that event, opening 74 in end cap 16 is not required.

An axially movable ring-shaped clapper member 76, constructed of a magnetic material such as steel, is mounted between flange portion 52 and magnet member 66 concentric to hub portion 54 of ball retainer 50. An inclined surface or clapper ramp 78 is formed on the interior of clapper member 76 and is inclined at an angle with respect to a plane parallel to the direction of movement of clapper member 76. Clapper ramp 78 contacts and rides on projecting portion 62 of balls 60 thereby spacing clapper member 76 radially from hub portion 54. In the neutral position of spool 14 projecting ball portion 62 and the inclination of clapper ramp 78 space clapper member 76 from magnet member 66 forming an air gap there between. The air gap insulating the clapper member from the magnetic force generated by the magnet member.

A centering spring 80 for imparting a biasing force to spool 14 is positioned in end cap 16 between ball retainer 50 and closure member 28. The biasing force urges spool 14 and attached spool extension 40 from the detented position to the neutral position. Centering spring 80 includes a compression spring 82 arranged between first and second dish-shaped spring retainers 84 and 86. Compression of spring 82 maintains spring retainer 86 in contact with flange portion 52 of the ball retainer and spring retainer 84 in contact with spool 14. Spool extension 40 extends through central openings 88 and 90 formed in spring retainers 84 and 86. Annular shoulder 44 of the spool extension being adapted to engage spring retainer 86 adjacent central opening 90 thereof for limiting axial movement of the spool extension.

A compression spring member 92 engaging clapper member 76 exerts a pre-load force thereon for urging clapper member 76 in the direction of magnet member 66 and maintains clapper ramp 78 in engagement with balls 60. The pre-load force of spring member 92 is substantially less than the magnetic force and decreases in magnitude as the clapper member approaches the magnet member. Spring member 92 is arranged between flange portion 52 of ball retainer 50 and clapper member 76. The pre-load force exerted by compression spring 92 need only be sufficient to overcome the inertia and frictional resistance to movement of clapper member 76 and balls 60. It has been found that an axial pre-load force of five pounds reliably drives clapper member 76 and balls 60 into the detented relationship with detent groove 46.

In operation of magnetic detent 10, spool 14 is moved or shifted from the neutral position to a detented position. This movement compresses centering spring 80 thereby increasing the biasing force which acts to resist movement of spool 14 and attached spool extension 40. In the detented position centering spring 80 exerts a biasing force tending to return spool 14 to the neutral position. As one of detent grooves 46 moves into alignment with the row of balls 60 the pre-load force acting on balls 60 through clapper ramp 78 drives balls 60 radially into detent groove 46. As balls 60 move into detent groove 46 the amount of projection of balls 60 above the periphery of hub portion 54 is reduced allowing clapper member 76, driven by the pre-load force, to move toward the magnet member 66 and close the air gap. With balls 60 fully engaged in detent groove 46 and the air gap closed, the clapper member contacts the magnet member and is held by the magnetic force. The biasing force acting through groove ramp 48 tends to move balls 60 radially out of engagement with detent groove 46. However, clapper member 76 held by the magnetic force prevents radial movement of balls 60 out of detent groove 46. The relatively small pre-load force and the magnetic force combine to form a detenting force acting through clapper ramp 78 on balls 60 to balance the biasing force acting on balls 60 through groove ramp 48 and lock ball 60 in detent groove 46 thereby maintaining spool extension 40 in the detented position. For safety of operation the detenting force is selected to exert an axial force on the spool extension of 25% to 50% of the biasing force. Since the magnetic force does not act on spool extension 40 until the air gap is closed, the spool extension 40 senses the effects of the detenting force only after the balls 60 are engaged in detent groove 46. The shifting force required to move spool 14 from the neutral position to the detented position need only be sufficient to overcome the relatively light pre-load force combined with the biasing force of centering spring 80.

Release of the spool extension from the detented position can be achieved by upsetting the force balance in the detented condition. Release can be effected either by direct actuation of the spool with sufficient force to overcome the force balance or from remote locations by interruption of electric power to the electromagnet or by introducing a fluid under pressure into the end cap to displace clapper member 76 from contact with either the electromagnet or permanent magnet variations of magnet member 66.

To this latter end, as shown in FIGS. 1, 3, and 5, a release member 94 adapted to activate clapper member 76 includes an axially movable cylindrically shaped hollow piston 96 arranged concentric with spool extension 40 in end cap 16 adjacent second end 22 thereof. Piston 96 is formed with an open end 98 spaced from a closed end 100. Closed end 100 is positioned in chamber 36 with open end 98 facing a distal end 102 of hub portion 54 of ball retainer 50. A pair of diametrically opposed arcuate shaped projections 104 extend axially from open end 98 of piston 96 and are adapted to contact clapper member 76 upon movement of piston 96. Piston 96 is formed with an annular shoulder 106 on the interior surface thereof intermediate open and closed ends 98 and 100. A piston return spring 108 is positioned in piston 96 between annular shoulder 106 and distal end 102 of ball retainer 50 for urging piston 96 in the direction of inlet 38.

Release of clapper member 76 by piston 96 from its magnetically held contact with magnet member 66 is achieved by introducing a pressurized fluid through inlet 38 into chamber 36. The pressurized fluid acting on the surface of closed end 100 of piston 96 moves the piston and piston projections 104 into contact with clapper member 76 thereby activating movement of the clapper member away from magnet member 66 breaking the hold of the magnetic force thereon. Movement of the clapper member away from the magnet member frees the balls for radial movement out of the detent groove due to the biasing force acting on the balls through the groove ramp. As the balls move out of the detent groove the biasing force of the centering spring returns the spool and the spool extension to the neutral position. Upon release of pressure in chamber 36, spring 108 returns piston 96 to its non-pressurized position.

In the case of the permanent magnet member 66, piston 96 is required to achieve remote release of the detented spool extension. However, piston 96 may be eliminated from end cap 16 and inlet 34 closed by a plug member 110, FIGS. 2 and 4, if only electrical remote release is desired in the electromagnet variation of magnetic detent 10.

As will now be understood, the present invention has many advantages in use. One is that operator fatigue is minimized by the magnetic detent herein described wherein the detenting force required to hold the spool in the detented position does not affect the shifting force required to move the spool from the neutral position. Further, stocking of parts is simplified in that one magnet member having a predetermined magnetic force may function with a number of centering springs having different biasing force characteristics and wherein one clapper member functions for all combinations of centering springs and magnet members.

It will be apparent to those skilled in the art that many changes may be made to the above described invention without departing from the spirit of the invention and the scope of the appended claims.

What is claimed is:

1. A magnetic detent for a control valve, said valve having a sliding spool movable from a neutral position to a detented position, said magnetic detent being housed within an end cap adapted for mounting to said valve, the magnetic detent comprising:
   a. a magnet member mounted in said end cap;
   b. a spool extension having spaced annular detent grooves formed in the periphery thereof and adapted for attachment to and movement with said sliding spool;
   c. a centering spring mounted in said end cap in engagement with said spool extension and biasing said spool extension to said neutral position;
   d. a clapper member movably mounted in said end cap;
   e. a plurality of axially aligned balls interposed between said clapper member and the periphery of the spool extension, said balls spacing said clapper member from said magnet member when said spool extension is in said neutral position;
   f. a spring member having a stationary end bearing against a member fixed in said end cap and a movable end bearing against said clapper member and urging said clapper member in the direction of said magnet member and, in turn, urging said balls against the periphery of the spool extension such that upon movement of the spool extension in either direction from said neutral position said spring member expands to drive said clapper member toward said magnet so that the balls move radially into one of said detent grooves and said clapper member thereafter is moved into contact with the magnet member.

2. The magnetic detent of claim 1 wherein the force exerted by said spring member on said clapper member decreases in magnitude as said clapper member approaches said magnet member.

3. The magnetic detent of claim 1 wherein said fixed member includes a ball retainer mounted in said end cap having a bore supporting said spool extension for axially sliding movement therein, said retainer holding said balls in circumferentially spaced relationship around the periphery of said spool extension.

4. The magnetic detent of claim 1 wherein said magnet member includes an electromagnet having an electrically energizable coil member.

5. The magnet detent of claim 1 wherein said magnet member includes a permanent magnet.

6. The magnetic detent of claim 1, 2, 3, 4, or 5 wherein movable release means are arranged in said end cap adjacent said clapper member for moving said clapper member out of contact with said magnet member.

7. The magnetic detent of claim 6 wherein said release means includes a piston member having a closed end positioned in a chamber in said end cap, said chamber adapted to receive pressurized fluid for activating said piston member into contact with said clapper member to move said clapper member out of contact with the magnet member.

8. The magnetic detent of claim 7 wherein said piston member includes an open end spaced from said closed end and having a pair of diametrically opposed projections, said projections contacting said clapper member upon activation of said piston member.

9. The magnetic detent of claim 8 wherein said release means includes a shoulder formed on said piston member adjacent said open end and a return spring arranged between said shoulder and a distal end of the ball retainer urging said piston member in a direction away from said clapper member.

10. A magnetic detent for a control valve, said valve having a sliding spool movable from a neutral position to a detented position, said magnetic detent housed within an end cap adapted for mounting to said valve, the magnetic detent comprising:
  a. a spool extension having a detent groove formed in the periphery thereof and adapted for attachment to and movement with said spool;
  b. a centering spring mounted in said end cap exerting a biasing force on said spool extension for urging the spool extension from said detented position to said neutral position;
  c. a plurality of balls mounted for radial movement around the periphery of said spool extension;
  d. a clapper member movably mounted on said balls and in driving contact therewith;
  e. a spring member engaging said clapper member and exerting a pre-load force thereto in said neutral position and urging said balls radially against the periphery of said spool extension;
  f. a magnet member generating a predetermined magnetic force mounted in said end cap spaced from said clapper member in said neutral position; and
  g. upon movement of the spool extension from the neutral position said pre-load force driving said clapper member into magnetically held contact with said magnet member, and said balls into engagement with said detent groove in the detented position of the spool extension, and in the detented position said pre-load force and said magnetic force combining to form a detenting force locking said balls in the detent groove against the biasing force of said centering spring; and
  h. said pre-load force is substantially less than said magnetic force in said neutral position and decreases in magnitude as the spool extension approaches said detented position and in said neutral position said pre-load force combines with said biasing force to form a shifting force required to move the spool extension from the neutral position to the detented position; and
  i. movable release means arranged in said end cap adjacent said clapper member for moving said clapper member out of magnetically held contact with said magnet member;
  j. said release means including a piston member having a closed end positioned in a chamber formed in one end of said end cap, said chamber adapted to receive a pressurized fluid for activating said piston member into contact with and moving said clapper member out of said magnetically held contact; and
  k. said piston member including an open end spaced from said closed end and having a pair of diametrically opposed arcuate shaped projections, said projections contacting said clapper member upon activation of said piston member.

11. The magnetic detent of claim 10 wherein said piston member includes an annular shoulder formed on an interior surface thereof adjacent said open end and a return spring arranged between said annular shoulder and a distal end of said stationary ball retainer for urging said piston member in a direction away from said clapper member.

* * * * *